(12) United States Patent
Huang et al.

(10) Patent No.: US 7,090,211 B2
(45) Date of Patent: Aug. 15, 2006

(54) ASSEMBLING DEVICE FOR LIQUID CRYSTAL DISPLAYS

(75) Inventors: Chung-Sung Huang, Miao-Li (TW); Jian-Jun Yang, Shenzhen (CN)

(73) Assignee: Innolux Display Corp., Miaoli (TW)

( * ) Notice: Subject to any disclaimer, the term of this patent is extended or adjusted under 35 U.S.C. 154(b) by 0 days.

(21) Appl. No.: 11/057,918

(22) Filed: Feb. 14, 2005

(65) Prior Publication Data
US 2005/0179187 A1   Aug. 18, 2005

(30) Foreign Application Priority Data
Feb. 14, 2004   (CN) .................. 2004 1 0015379

(51) Int. Cl.
*B23Q 3/00* (2006.01)
(52) U.S. Cl. .................... 269/305; 269/289 R
(58) Field of Classification Search ........... 269/305, 269/289 R, 43; 29/281.1
See application file for complete search history.

(56) References Cited

U.S. PATENT DOCUMENTS

| | | | | |
|---|---|---|---|---|
| 5,760,864 A | * | 6/1998 | Yamada et al. | 349/187 |
| 5,820,120 A | * | 10/1998 | Anderson | 269/99 |
| 6,530,302 B1 | * | 3/2003 | Rogers | 83/452 |
| 6,575,444 B1 | * | 6/2003 | Bidaud | 269/91 |
| 6,702,269 B1 | * | 3/2004 | Tadich | 269/37 |

* cited by examiner

*Primary Examiner*—Lee D Wilson
(74) *Attorney, Agent, or Firm*—Wei Te Chung

(57) ABSTRACT

An assembling device for holding a liquid crystal display (LCD) thereon includes a base plate (110), a first clamp plate (120) fixed on the base plate, and a second clamp plate (130) movably set on the base plate. The first clamp plate has a first claw portion (124). The second clamp plate has a second claw portion (134). The first claw portion and the second claw portion are diagonally placed to hold two diagonally opposite corners of the LCD. Because the assembling device has the movable clamp plate, the space surrounded by the claw portions of the clamp plates can be changed. Thus, LCDs of various different sizes can be held on the same assembling device.

3 Claims, 3 Drawing Sheets

ASSEMBLING DEVICE FOR LIQUID CRYSTAL DISPLAYS

BACKGROUND OF THE INVENTION

1. Field of the Invention

The present invention relates to an assembling device, and especially to an assembling device used to hold and assemble a liquid crystal display (LCD).

2. Description of Prior Art

A process of fabricating an LCD generally comprises forming an LCD panel (known as a "cell process"), and assembling the LCD panel with other parts such as a light guide plate, optic films, a printed circuit board (PCB), etc. (known as a "modular process").

The modular process generally is accomplished by an assembling device. The assembling device commonly comprises a clamp element and a test circuit. The clamp element is used for holding the LCD, so that the assembling device can assist in adhering optic films on the light guide plate and assembling the LCD panel with the light guide plate. The test circuit is used for testing the capability of the light guide plate.

The clamp element of a conventional assembling device is immovable. Thus, one kind of conventional assembling device can only hold one kind of LCD with a specific size. However, LCDs are made in many different sizes according to a wide variety of different requirements. Each time a manufacturer needs to assemble a new LCD with a different size, a new assembling device must be provided. Alternatively, an existing assembling device must be adapted so that it can be used for the new size LCD. Either way, it is inevitable that the costs of mass production are unduly inflated.

Thus, a new adaptable assembling device which overcomes the above-mentioned disadvantages is desired.

SUMMARY OF THE INVENTION

An object of the present invention is to provide an assembling device that can be used to assemble LCDs of various different sizes.

According to the present invention, an assembling device for holding a liquid crystal display (LCD) thereon comprises a base plate, a first clamp plate fixed on the base plate, and a second clamp plate movably set on the base plate. The first clamp plate has a first claw portion. The second clamp plate has a second claw portion. The first claw portion and the second claw portion are diagonally placed to hold two diagonally opposite corners of the LCD. Because the assembling device has the movable clamp plate, the space surrounded by the claw portions of the clamp plates can be changed. Thus, LCDs of various different sizes can be held on the same assembling device.

Other objects, advantages, and novel features of the present invention will become more apparent from the following detailed description when taken in conjunction with the accompanying drawings, in which:

DETAILED DESCRIPTION OF THE INVENTION

Reference will now be made to the drawings to describe the present invention in detail.

Figure 1:
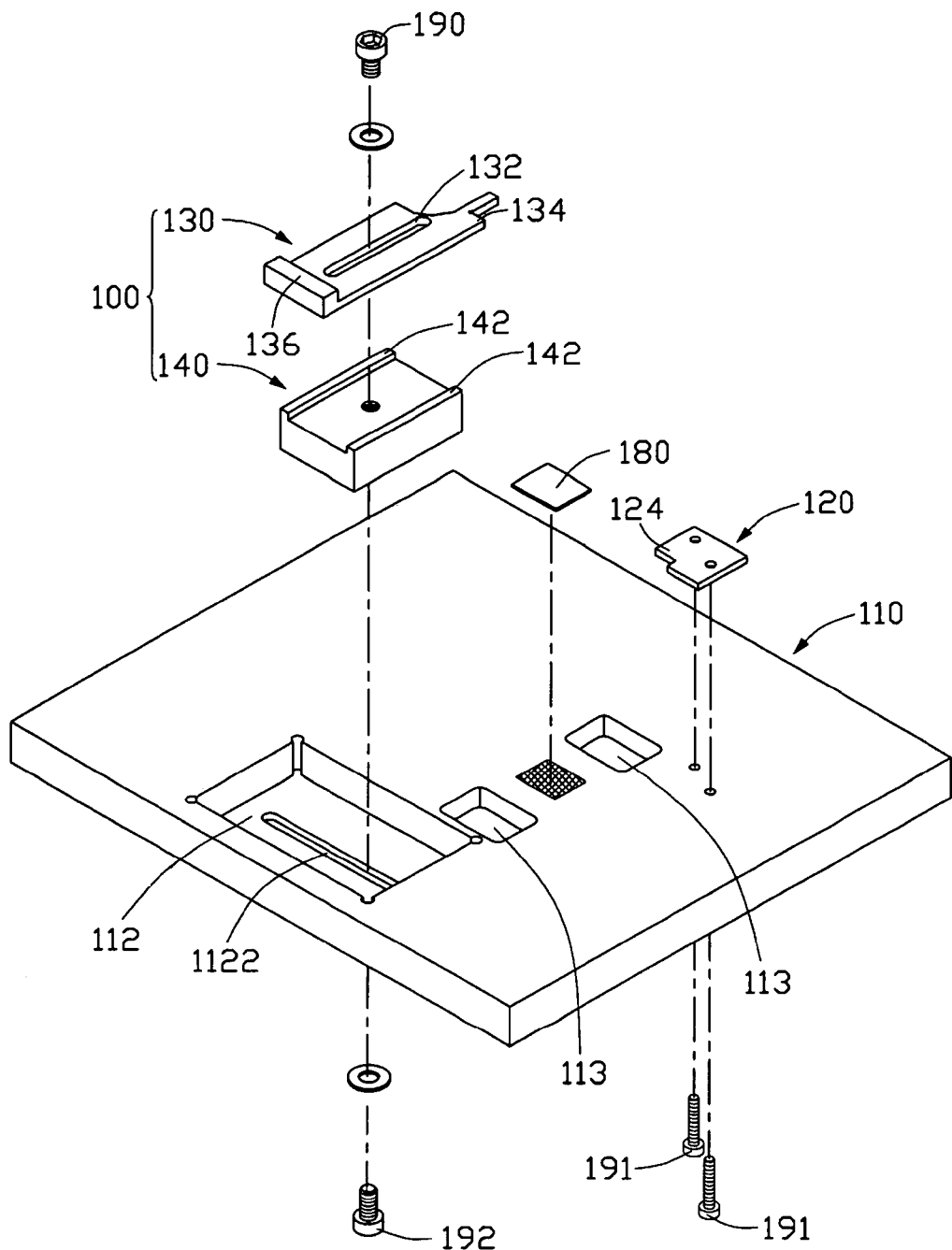
FIG. 1 is an exploded, isometric view of a first embodiment of an assembling device according to the present invention.

Referring to FIG. 1, this shows an exploded, isometric view of a first embodiment of an assembling device according to the present invention. The assembling device comprises a base plate 110, a clamp plate 120, and an adjustor 100 with a clamp plate 130.

The base plate 110 comprises a runner 112, a cushion 180 fixed on the vicinal center of the base plate 110, and two grooves 113 defined at opposite sides of the cushion 180 respectively. A slot 1122 is defined in a bottom of the base plate 110, below and in communication with the runner 112. The clamp plate 120 comprises a right-angled claw portion 124.

The adjustor 100 comprises a slider 140 and the clamp plate 130. The slider 140 comprises two parallel guide rails 142, which define a guiding groove (not labeled) therebetween. The clamp plate 130 comprises a right-angled claw portion 134 at one end thereof, a central slot 132, and a handle 136 upwardly formed at an opposite end thereof. The clamp plate 130 is set in the guiding groove of the slider 140, and can slide along the guiding groove. The slot 132 is perpendicular to the slot 1122.

Figure 2:
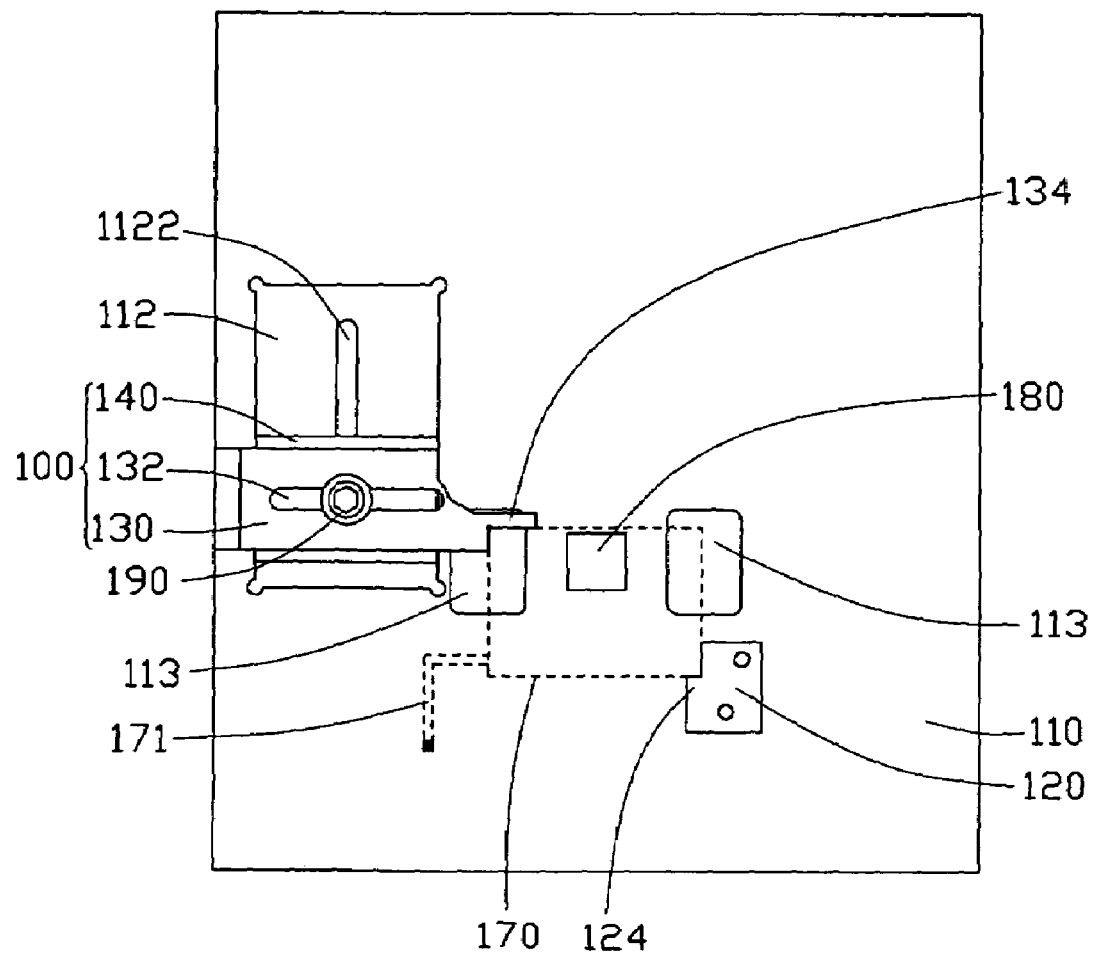
FIG. 2 is a top elevation of the assembling device of FIG. 1, also showing in broken lines an LCD held by the assembling device.

Also referring to FIG. 2, this shows a top elevation of the assembling device. In assembly of the assembling device, the clamp plate 120 is fixed on one corner of the base plate 110 by two bolts 191. The slider 140 is set in the runner 112, and can slide along the runner 112. The two right-angled claw portions 124, 134 are oriented diagonally opposite each other, in order to hold an LCD 170. The LCD 170 has a circuit 171 with a light emitting diode (LED). In addition, when the slider 140 is slid to a desired location, a bolt 192 is extended up through the slot 1122 and screwed into the slider 140. Thus, the slider 140 is held in the desired position in the runner 112. The handle 136 is used to push or pull the clamp plate 130 to slide along the guiding groove. When the clamp plate 130 is slid to a desired location, a bolt 190 is extended down through the slot 132 and screwed into the slider 140. Thus, the clamp plate 130 is held in the desired position on the slider 140.

The LCD 170 is usually rectangular, with four right-angled corners. The right-angled claw portions 124 and 134 readily clamp two diagonally opposite corners of the LCD 170. To avoid the claw portions 124 and 134 interfering with the circuit 171, the lengths of the two sides of each claw portion 124 and 134 are limited to between 3mm and 5mm. The two grooves 113 are used to expediently place the LCD 170 on the base plate 110 and lift the LCD 170 off from the base plate 110. The cushion 180 has a foam or fiber structure, and is used for protecting the LCD 170 from damage. To avoid static electricity, the assembling device of the present invention is generally made of anti-static materials, except for the cushion 180 and the bolts 190, 191.

In use, when the LCD 170 with a specific size needs to be held on the assembling device, an operator can manipulate the assembling device as follows. Firstly, the slider 140 is slid along the runner 112 in a longitudinal direction (according to FIG. 2), until a longitudinal distance between the claw portions 124 and 134 is equal to a width of the LCD 170. Secondly, the clamp plate 130 is slid along the guiding groove of the slider 140 in a transverse direction, until a transverse distance between the claw portions 124 and 134 is equal to a length of the LCD 170. After the clamp plate 130 is positioned according to the size of the LCD 170, the clamp plate 130 and the slider 140 are fixed by the bolts 190, 192 respectively. The LCD 170 is thus held on the assembling device and is ready to begin an assembly process.

Figure 3:
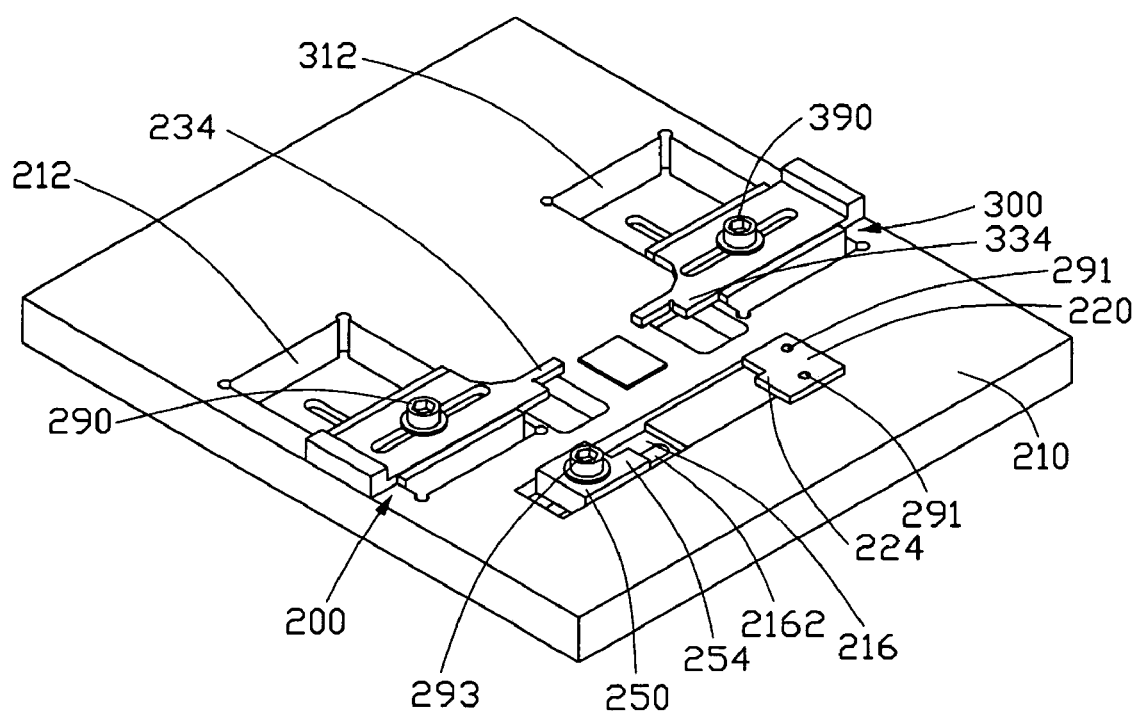
FIG. 3 is an isometric view of a second embodiment of an assembling device according to the present invention.

Referring to FIG. 3, this shows a second embodiment of an assembling device in accordance with the present invention. The assembling device is used for holding an LCD thereon, the LCD not having a circuit like the circuit 171 of the LCD 170. The assembling device comprises a base plate 210, two clamp plates 220, 250, and two adjustors 200, 300. The base plate 210 comprises three runners 212, 312, and 216. A slot 2162 is defined in a bottom of the base plate 210, below and in communication with the runner 216. The clamp plate 220 comprises a right-angled claw portion 224. The clamp plate 250 comprises a right-angled claw portion 254. The two adjustors 200, 300 each have essentially the same structure as that of the adjustor 100 of the first embodiment. In particular, the adjustors 200, 300 comprise right-angled claw portions 234, 334, respectively.

In assembly and use of the assembling device, the clamp plate 220 is fixed on the base plate 210 by two bolts 291. The clamp plate 250 is set in the runner 216 and can slide along the runner 216. The regulator 200 is set in the runner 212 and can slide along the runner 212. The regulator 300 is set in the runner 312 and can slide along the runner 312. The clamp plate 250 and the adjustors 200, 300 are slid to desired locations, and are then fixed by bolts 293, 290, 390, respectively. The LCD is thus held on the assembling device and is ready to begin an assembly process.

Because the assembling device of present invention has slidable clamp plates, the space surrounded by the claw portions of the clamp plates can be readily adjusted. Thus, LCDs with different sizes can be conveniently held on the same assembling device as needed.

In alternative embodiments, the right-angled claw portions 124, 134, 224, 234 and/or 254 can be replaced by claw portions with other shapes. For example, rounded claw portions may be employed in order to clamp LCDs having rounded corners.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An assembling device for holding a liquid crystal display thereon, comprising:
    a base plate;
    a clamp plate fixed on the base plate, the clamp plate having a claw portion; and
    a plurality of claw portions movably set on the base plate;
    wherein, at least one of the movable claw portions is movable relative to the base plate in both lengthwise and transverse directions, and the movable claw portions are slidably set in runners of the base plate and slidably connected with sliders.

2. The assembling device as recited in claim 1, wherein all the claw portions are right-angled claw portions.

3. The assembling device as recited in claim 1, wherein all the claw portions are rounded claw portions.

* * * * *